(No Model.)

H. B. ALLEN.
PAN FOR WASHING DISHES.

No. 340,027. Patented Apr. 13, 1886.

Witnesses.
Robert Everett.
Dennis Sumby.

Inventor.
Harriet B. Allen.
By James L. Norris.
Atty.

UNITED STATES PATENT OFFICE.

HARRIET B. ALLEN, OF ST. LOUIS, MISSOURI.

PAN FOR WASHING DISHES.

SPECIFICATION forming part of Letters Patent No. 340,027, dated April 13, 1886.

Application filed April 6, 1885. Serial No. 161.331. (No model.)

*To all whom it may concern:*

Be it known that I, HARRIET B. ALLEN, a citizen of the United States, residing at St. Louis, Missouri, have invented new and useful Improvements in Pans for Washing Dishes, of which the following is a specification.

In washing glass, china, porcelain, and other fragile table-ware in sheet-metal or other metallic vessels or pans they are frequently brought into forcible contact with the upper edge of the pan—as when placing them therein or removing them therefrom—thus breaking the articles or chipping pieces from them. This is a source of great annoyance, besides the expense incident to replacing the broken or chipped articles.

The objects of my invention are to prevent such accidents, and to provide a sheet-metal or other metallic dish pan or vessel in which all the fragile articles of table-ware can be washed without possibility of their being broken, chipped, or injured by coming in contact with the upper edge of the vessel or pan.

To such end my invention consists in a metal dish-pan having the top edge of its side wall provided with an attached dish guard or shield of soft rubber or other elastic material for covering and concealing such top edge, and thereby preventing any article washed in the pan or vessel from coming in direct contact with the metallic top edge thereof.

The invention also consists in a dish pan or vessel having the top edge of its side wall provided with a dish guard or shield of soft rubber or other elastic material, which embraces the opposite sides of the pan around its top edge, and is confined thereto by the inherent elasticity of the rubber or other elastic material, thus preventing articles of fragile tableware from coming in direct contact with the top edge of the pan.

The invention also consists in a sheet-metal dish pan or vessel having the top edge of its side wall laterally enlarged to form a surrounding bead or shoulder, which is provided with a soft rubber or other elastic covering, confined upon and around the bead or shoulder by the inherent elasticity of the rubber, thereby guarding or shielding all sides of the top edge of the pan or vessel.

Figure 1:
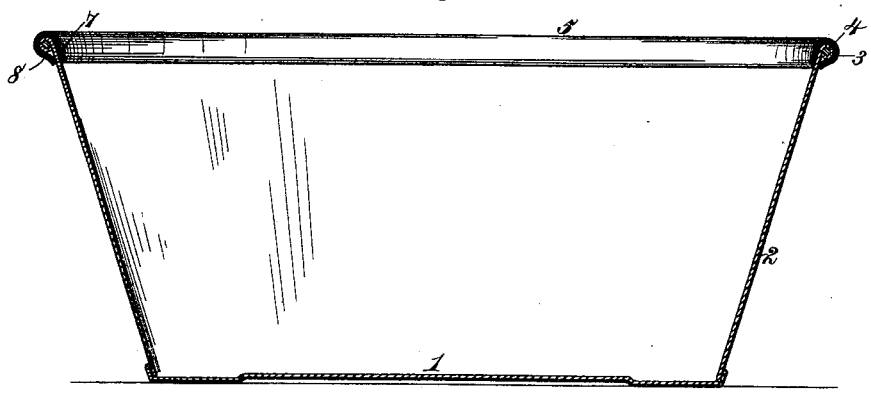
Figure 2:
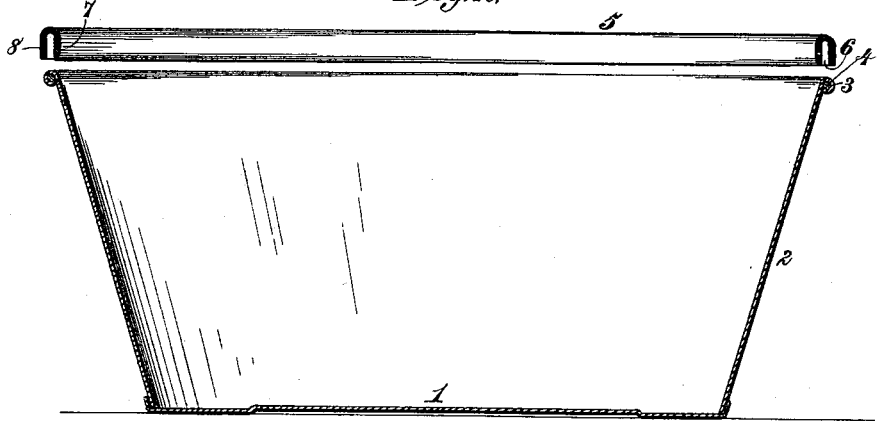
Figure 3:
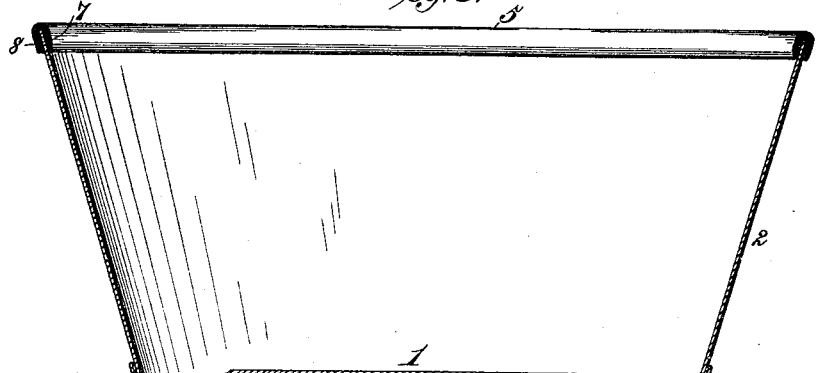

The invention is illustrated in the accompanying drawings, in which Figure 1 is a vertical central sectional view of a dish-pan provided with my invention; Fig. 2, a similar view showing the shield and pan separated; Fig. 3, a similar view showing a modification of the invention.

In order to enable those skilled in the art to make and use my invention, I will now describe the same in detail, reference being made to the drawings, where the numeral 1 indicates the bottom, and 2 the side wall, of a pan or vessel so constructed as to receive and hold the water necessary for washing table-ware, such as glass, china, porcelain, or other fragile articles.

This pan is of sheet or other metal, and has the top edge of its side wall laterally enlarged to form a continuous surrounding bead or shoulder, 3, which is preferably formed, as usual, by wiring the edge of the pan, as at 4. The top edge thus provided is covered by a dish guard or shield, 5, of soft rubber or other elastic material, made of a ring of rubber, having an annular groove or recess, 6, of a width less than the thickness of the bead or shoulder in cross-section, in such manner that the ring can be sprung upon and around the bead, and be thereon confined by the inherent elasticity of the ring. These shields or guards of ring form can be molded into the requisite shapes according to any of the methods ordinarily practiced in molding soft-rubber articles.

The pan may have its side wall, 2, constructed with a beadless or plain top edge, as shown in Fig. 3, and the elastic shield or guard 5 applied thereto by springing it on, as before described, the groove or recess in the rubber or other elastic ring being of a less width than the thickness of the top edge of the pan, whereby the ring will clamp the edge of the pan and be confined in place by its inherent elasticity.

I may apply some suitable cement to permanently unite the shield or guard to the edge of the pan; but I do not consider such essential.

It will be manifest that by the employment of a dish-pan having the top edge shielded or guarded according to my invention, all tableware—such as glass, china, porcelain, or other fragile dishes or articles—can be washed without danger of being broken, chipped, or injured by coming in contact with the metallic top edge of the pan, thereby materially reducing household expenses.

Having thus described my invention, what I claim is—

1. As an improved article of manufacture, a sheet-metal dish-pan having its upper edge provided with an elastic guard for preventing the breaking of dishes, substantially as described.

2. As an article of manufacture, a sheet-metal dish-pan having its upper edge beaded and wired, and provided with an elastic guard to prevent the breakage of dishes, substantially as described.

In testimony whereof I affix my signature in presence of two witnesses.

HARRIET B. ALLEN.

Witnesses:
JOHN A. HARRISON,
MASON G. SMITH.